No. 618,637. Patented Jan. 31, 1899.
L. BÉNIER.
MOTOR VEHICLE.
(Application filed Aug. 11, 1898.)
(No Model.) 2 Sheets—Sheet 2.
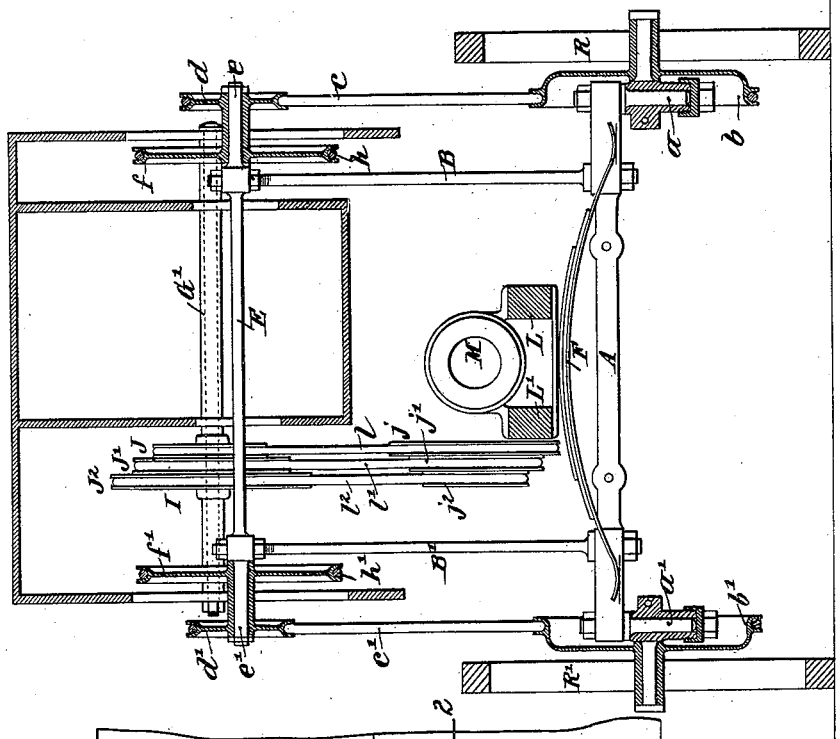
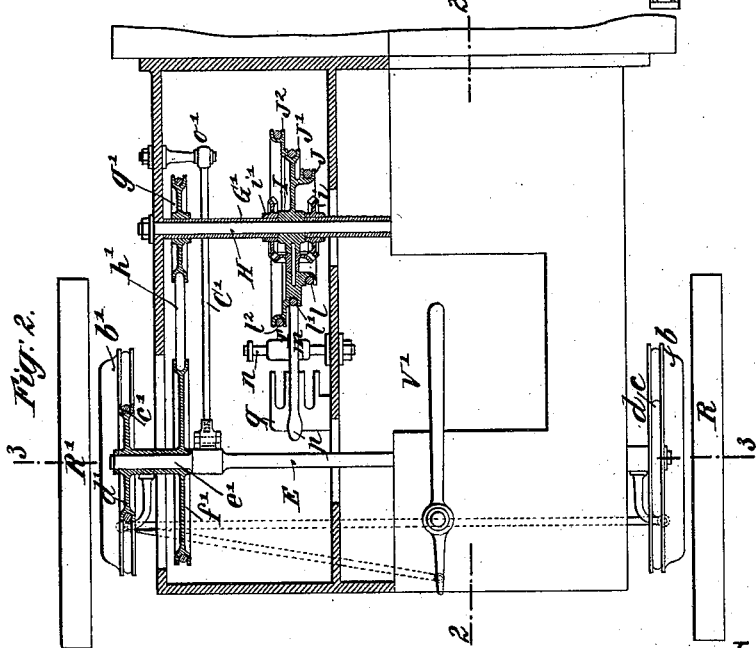
Witnesses:
M. A. Korff.
Christean Ganz.
Inventor:
Léon Bénier
By his attorney
E. J. Griswold

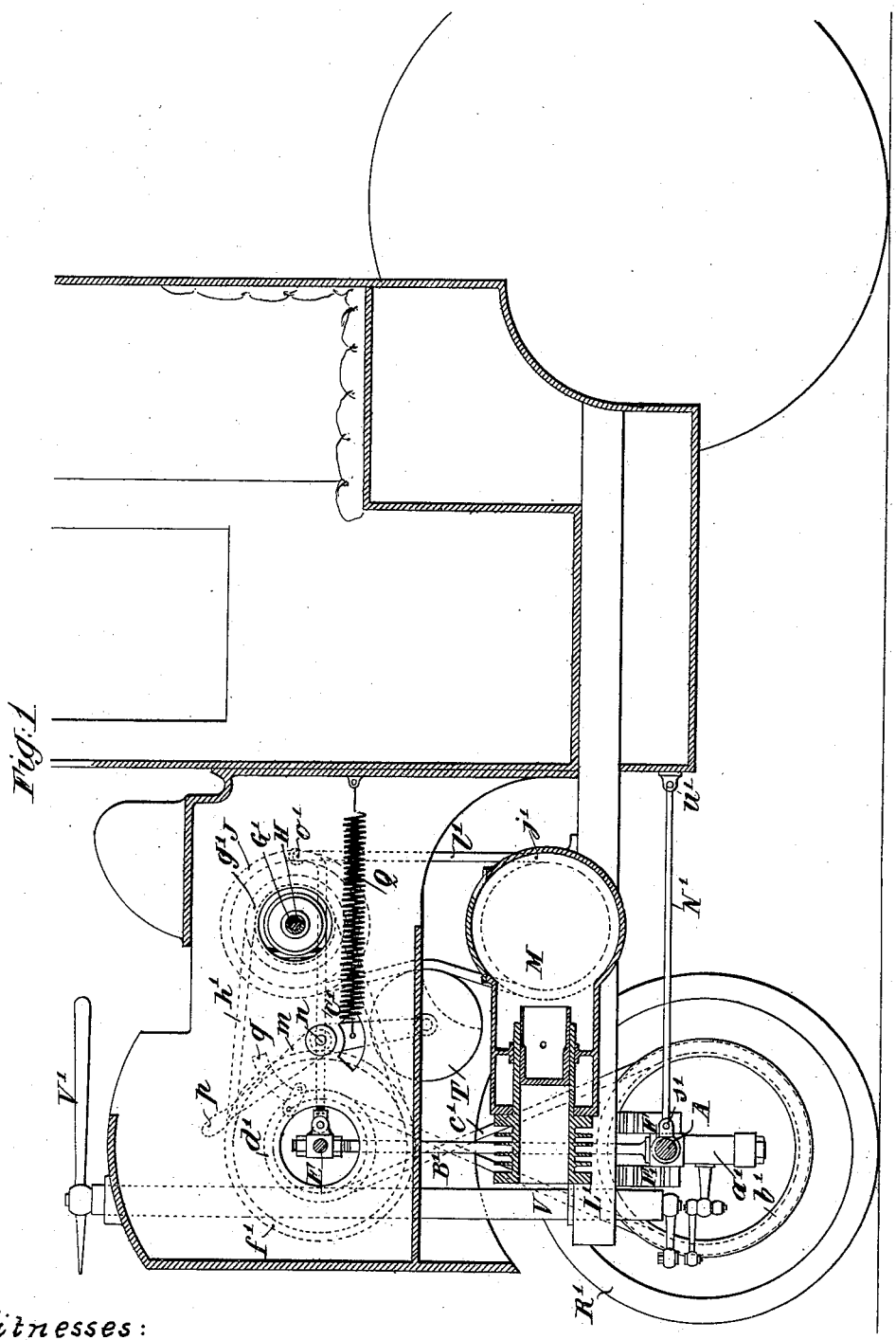

UNITED STATES PATENT OFFICE.

LÉON BÉNIER, OF PARIS, FRANCE.

MOTOR-VEHICLE.

SPECIFICATION forming part of Letters Patent No. 618,637, dated January 31, 1899.

Application filed August 11, 1898. Serial No. 688,335. (No model.)

*To all whom it may concern:*

Be it known that I, LÉON BÉNIER, engineer, a citizen of the Republic of France, residing at 9 Avenue des Ternes, Paris, in the Republic of France, have invented certain new and useful Improvements in Motor Road-Vehicles, of which the following is a specification.

This invention relates to improvements in motor-vehicles which are provided with automatic fore-carriages.

The said invention consists of a special device for driving the wheels of the fore-carriage, while yet enabling the said wheels to be used for steering purposes.

In order that the invention may be thoroughly understood, I will describe the same, with reference to the accompanying drawings, in which—

Figure 1 is a vertical longitudinal section through a motor-vehicle of any kind, the fore-carriage of which is constructed in accordance with my invention and provided with wheels serving at the same time as driving and guiding wheels, the left-hand end of said figure being taken on line 2 2 of Fig. 2. Fig. 2 shows this fore-carriage in plan, part of it seen from above and part in section; and Fig. 3 is a transverse section taken on the line 3 3 of Fig. 2.

In carrying my invention into practice the fore-carriage is provided with two wheels R and R', respectively, mounted on axle-journals $a$ and $a'$, pivotally connected in the ordinary manner to the ends of the fixed axle A, connected on its part to the main supports L and L' of the vehicle by means of flexible springs F F'. Each of the wheels R and R' of this fore-carriage comprises a concentric pulley $b$, so arranged that its rim turns in a vertical plane passing through the corresponding axis of rotation $a$. This pulley $b$ is connected by a driving-belt $c$ to a second pulley $d$ placed directly above and having its center lying along the vertical line passing through the aforesaid axis of rotation $a$. This second pulley $d$ is loosely mounted on an axis $e$, set in rotary motion at the end of a cross-bar E, supported in parallel direction to the fixed part of the axle A by means of two stays B and B', suitably fastened by bolts to the said cross-bar E and to the said axle A. The driving belt or rope $c$, which connects the pulleys $b$ and $d$, is either crossed or straight. The same transmits the movement under normal conditions when the vehicle moves in a straight line, while the said pulleys turn in the same plane. The said driving belt or rope, moreover, transmits the movement under normal conditions when for the purpose of changing the direction of the vehicle the wheel R, and consequently the pulley $b$, is caused to describe a certain angle around the axis of rotation $a$, (see Fig. 2, dotted lines,) for then, although the two pulleys $b$ and $d$ no longer turn in the same plane, the distance of their centers has not varied.

All that is necessary in order to regulate the tension of the driving-belts $c$ and $c'$ is to vary the distance of the cross-bar E relatively to the axle A. The bar E is supported in horizontal direction by means of two ties C and C', jointed at their forward ends to the said bar and at their other ends, at points $o$ $o'$, to the body of the vehicle. On the hub carrying the pulley $d$ a pulley $f$ is mounted, which through the intermediary of a driving-belt $h$ receives the movement from another pulley $g$, keyed on the extremity of a sleeve or socket G, running loosely on the transverse shaft H, secured by bolts to the body of the vehicle and nearly in the horizontal plane passing through the cross-bar E. This shaft H participates in the oscillating movements of the body under the action of flexible springs F F', while the cross-bar E is in no way subjected to the said oscillatory movements. It is evident that if the point of connection $o$ $o'$ of the ties C C' were placed directly on the shaft H the distance of the centers between the two sets of pulleys $f f'$ and $g g'$ would not vary, whatever the oscillatory movements of the body of the vehicle might be. By arranging this point of connection at the place indicated in the drawings—that is to say, near the shaft H—a distance is obtained between the centers which only varies to such an extent as not to impede the action of the driving-belts $h$ $h'$, which connect these two pulleys.

The sockets or sleeves G and G' are respectively provided with the pinions $i$ $i'$ of the differential mechanism I, of known construction, and said mechanism is combined with stepped pulleys J J' J², driven by corresponding pulleys $j$ $j'$ $j^2$, mounted on the shaft K of the motor M, which may be of any suitable system and which is preferably mounted on the main supports L L' of the vehicle. The driving-belts $l$ $l'$ $l^2$, serving to transmit the movement from one set of pulleys $j$ to the other set of pulleys J, only enter into respective operation so long as they are pressed by a stretching or tension mechanism T, formed by a pulley mounted on a lever $m$, oscillating on a pivot $n$ and furnished with an operating-handle $p$. It is thus possible to stop the movement of the vehicle without that of the motor being interrupted. One and the same tension apparatus serves for all three driving-belts. All that is necessary to do is to cause above-mentioned lever $m$ to slide upon the axis $n$, by which it is supported, so as to present the said lever to the driving-belt as required. It should be noticed that this sliding movement can only take place so long as the operating-arm $p$ of the lever $m$ is out of engagement with the guide $q$—that is to say, when the tension apparatus does not touch any of the belts $l$. It will also be observed that the lever $m$ is subjected to the action of an antagonistic spring Q, having the tendency of constantly applying the tension apparatus against the belts and the tension of which it must overcome in order to disengage the arm $n$ from the guide $q$. It will finally be understood that the axle A of the vehicle is connected to the body of the vehicle by ties N N', so jointed at $s$ $s'$ and $u$ $u'$ that the tractional effort exerted in horizontal direction is transmitted directly to this body without being conveyed by the intermediary of the suspension-springs F F'. The pivots $a$ $a'$ of the wheels R R' are connected by rods arranged in any known manner, these connecting-rods being secured to a vertical shaft V, provided with an operating-lever V', by the aid of which the conductor of the vehicle is enabled to change the direction of the vehicle as desired.

What I claim is—

1. In motor-vehicles the arrangement of a fore-carriage, the wheels of which are adapted to simultaneously serve as steering and driving wheels, the characteristic feature of the device consisting in the combination of an ordinary axle provided with pivotally-arranged axle-journals for the front wheels, and on which axle the fore-carriage is supported by the intermediary of suspension-springs; of a cross-bar connected with said axle, this cross-bar being arranged parallel to said axle and located in one and the same vertical plane, the position of this bar being insured on the one hand by the aid of rigid tie beams or bars and on the other hand by means of jointed ties coupled to the body of the vehicle; of a transverse shaft, connected to the body of the vehicle, carrying a differential mechanism and located near the place, where the above-mentioned ties are connected; and of any appropriate motor, supported by the main supports of the vehicle; the object of this arrangement being, to enable the motor to transmit, by the aid of pulleys and belts, its movement to the front wheels, irrespective of the direction taken by the latter, and of the flexion of the body of the vehicle; substantially as specified.

2. In a motor-vehicle, a device for driving the fore wheels while allowing the same to be used for steering, comprising pivoted fore wheels, a pulley secured to each fore wheel and having its center on the axis of pivoting of said fore wheel, and a pulley directly over each of the first said pulleys and having its center on a vertical line passing through the axis of pivoting of the fore wheel, substantially as described.

3. In a motor-vehicle, a device for driving the fore wheels while allowing the same to be used for steering, comprising an axle, fore wheels pivoted thereto, a pulley secured to each fore wheel and having its center on the axis of pivoting of said fore wheel, a pulley directly over each of the first said pulleys and having its center on a vertical line passing through the axis of pivoting of the wheel, and a cross-bar fixed to the said axle and carrying upper pulleys, substantially as described.

4. In a motor-vehicle, the combination of a wheel provided with a pivoted journal, and means for turning the wheel on the pivot, with a pulley secured to the said wheel, and a second pulley adapted to drive the first pulley and wheel, the center of both pulleys being on a line passing through the axis of pivoting of said wheel-journal, whereby when said wheel is turned on said pivot the distance between the centers of said pulleys is not varied.

In testimony whereof I have hereunto set my hand, in presence of two subscribing witnesses, this 29th day of July, 1898.

LÉON BÉNIER.

Witnesses:
LÉON FRANCKEN,
EDWARD P. MACLEAN.